Oct. 4, 1938.  O. P. HAEGELE  2,132,237
WEIGHING APPARATUS
Filed March 8, 1935  6 Sheets-Sheet 1

Inventor:
Otto P. Haegele
By Roland C. Rehm
Atty.

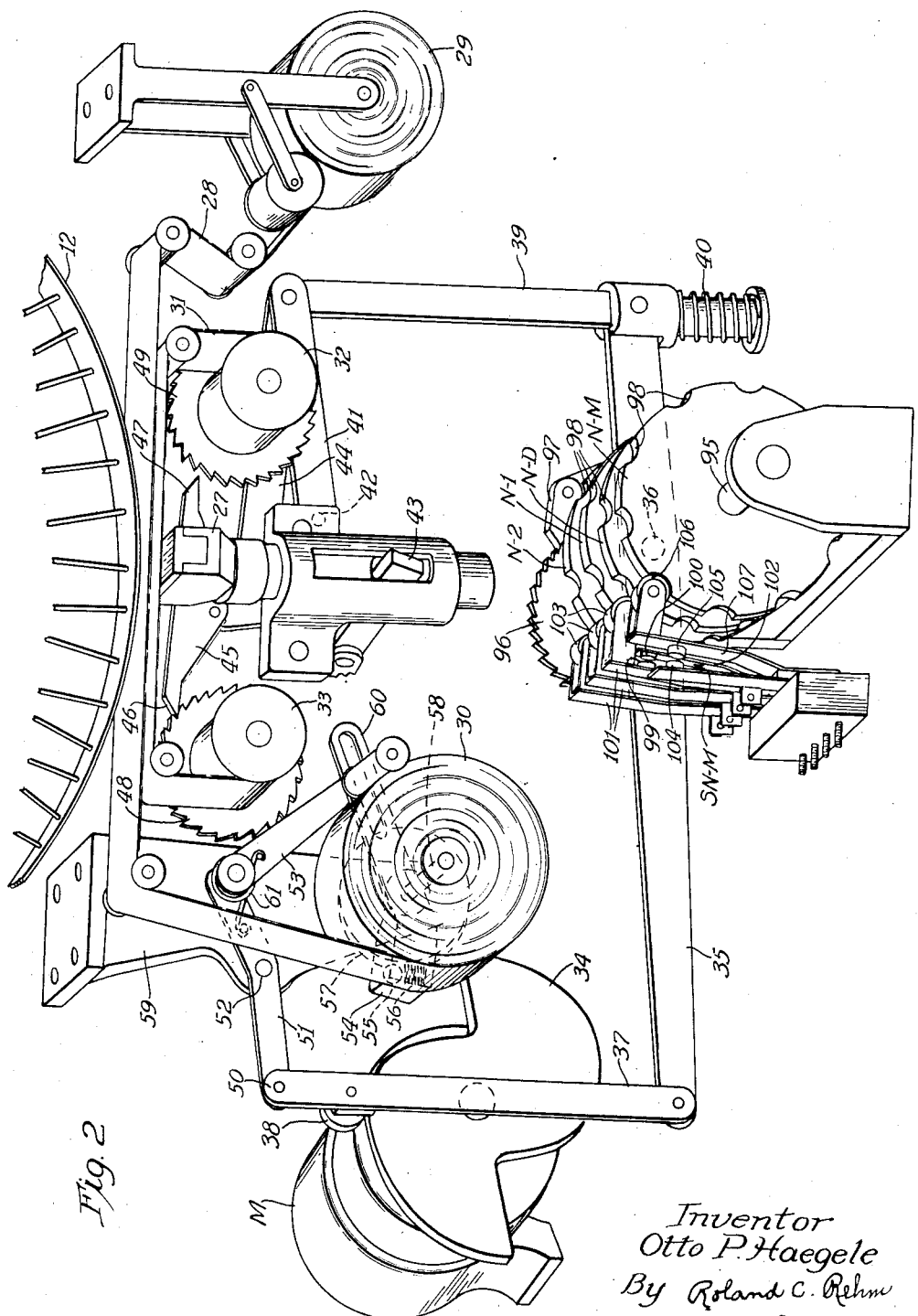

Oct. 4, 1938.　　　O. P. HAEGELE　　　2,132,237
WEIGHING APPARATUS
Filed March 8, 1935　　　6 Sheets-Sheet 3
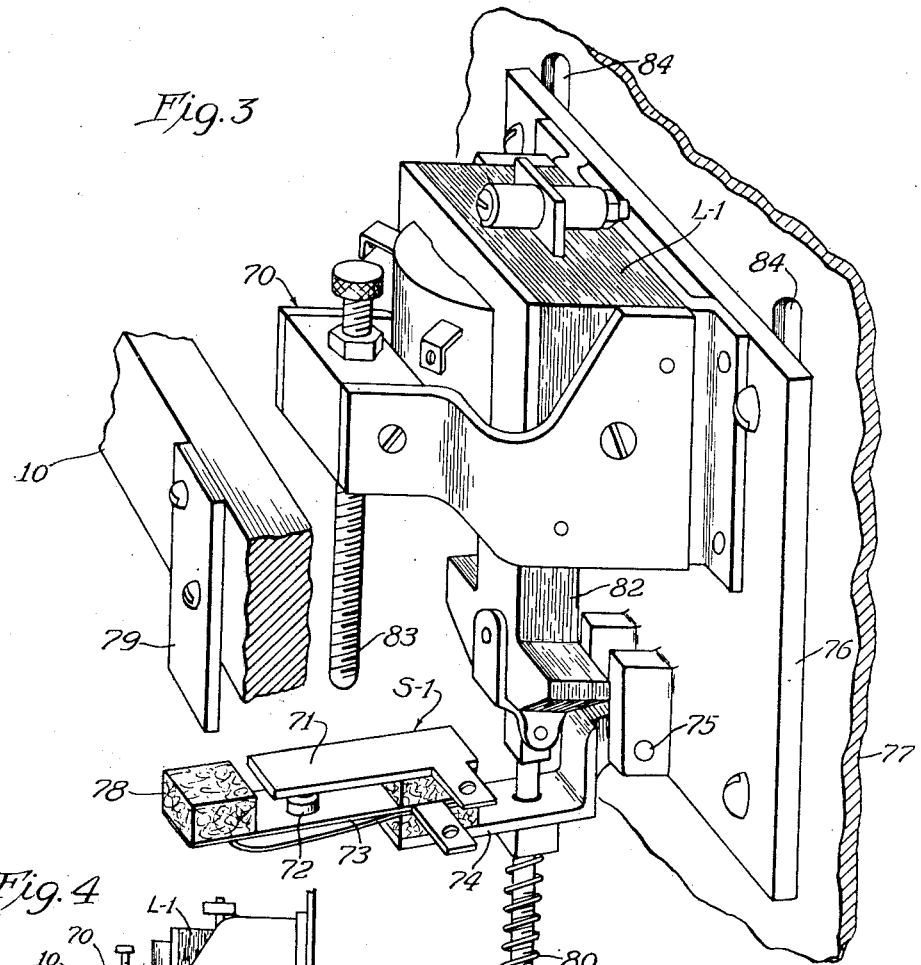
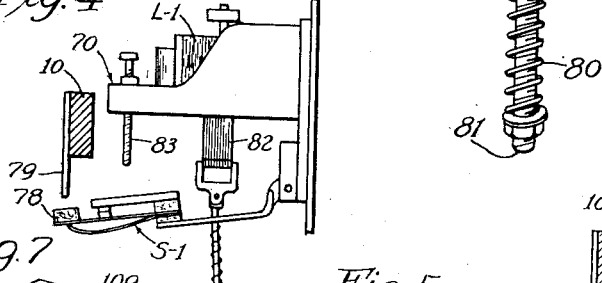
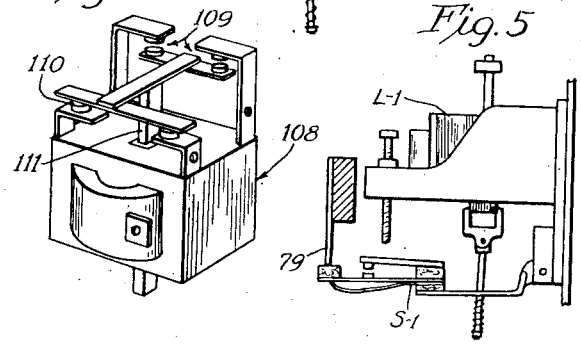
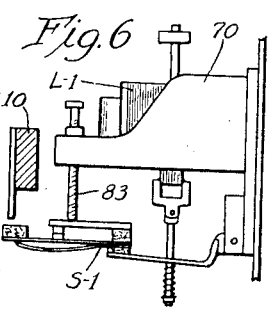
Inventor:
Otto P. Haegele
By Roland C. Rehm
Atty.

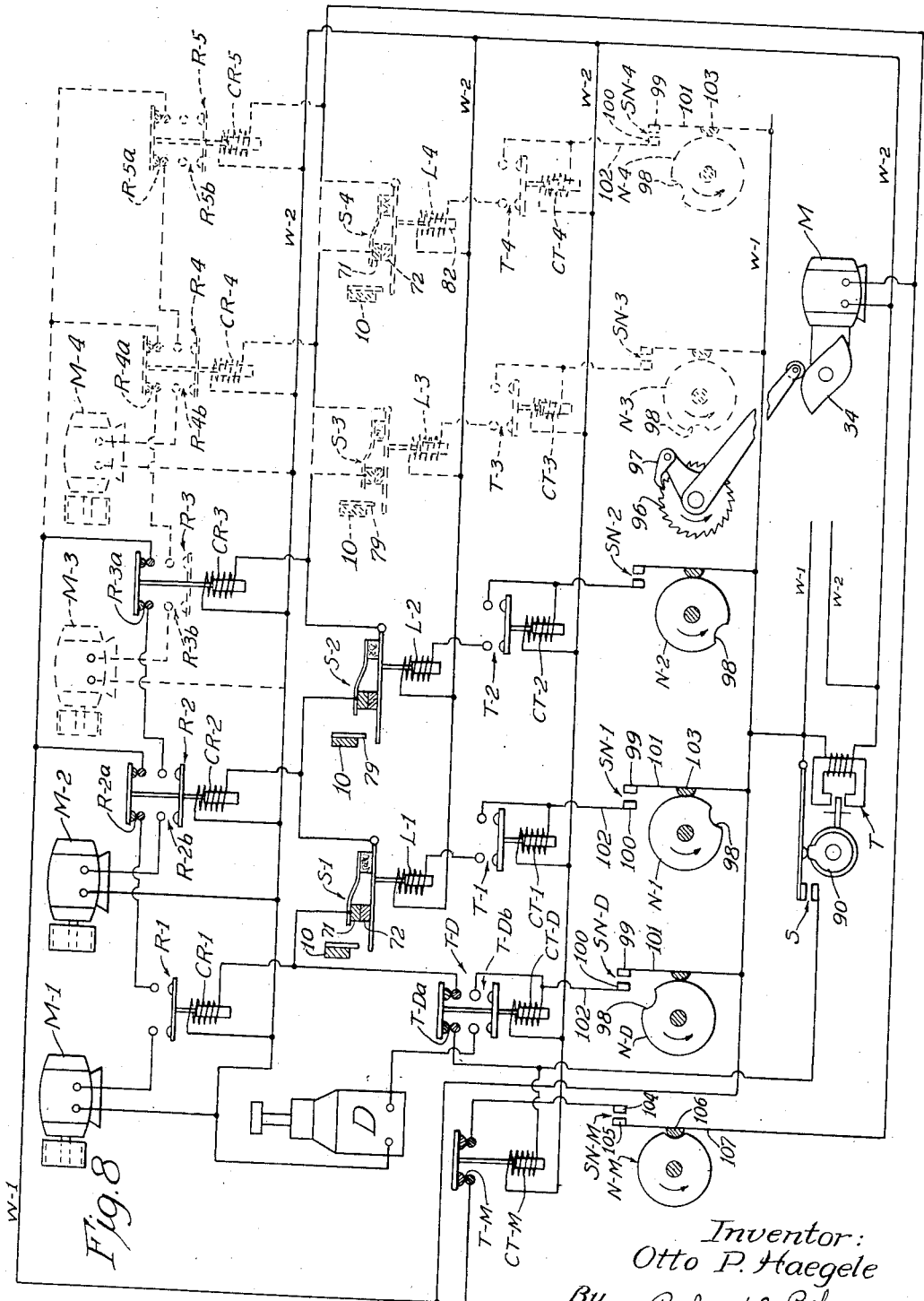

Oct. 4, 1938.   O. P. HAEGELE   2,132,237
WEIGHING APPARATUS
Filed March 8, 1935   6 Sheets-Sheet 5

Inventor:
Otto P. Haegele.
By Roland C. Rehm Atty.

Patented Oct. 4, 1938

2,132,237

UNITED STATES PATENT OFFICE 2,132,237

WEIGHING APPARATUS

Otto P. Haegele, Chicago, Ill., assignor to Streeter-Arnet Company, Chicago, Ill., a corporation of Illinois Application March 8, 1935, Serial No. 10,038

17 Claims. (Cl. 249—2)

This invention relates to automatic weighing devices and among other objects aims to provide means for controlling the weighing and recording of successive quantities of materials.

The nature of the invention may be readily understood by reference to one illustrative apparatus embodying the invention and shown in the accompanying drawings.

In said drawings:

Fig. 2 is a perspective view of details of the weight recording apparatus and related devices;

Fig. 3 is a perspective view of apparatus for controlling predetermined weights;

Figs. 4, 5 and 6 are views illustrating different positions and operations of the aforesaid controlling apparatus;

Fig. 7 is a view of a typical electrically actuated switch mechanism; and

Figs. 8, 9 and 10 are diagrammatic views of alternative electric actuating circuits and control mechanism for the apparatus.

The invention is here shown embodied in apparatus for weighing and recording predetermined quantities of a series of materials and for automatically controlling the cycle of operations involved in the delivery, weighing, recording, and discharge of such materials. The present apparatus is designed accurately to weigh and record approximately predetermined quantities of each of two materials, and to control the delivery of such materials to the weighing means and their discharge therefrom. As will presently appear, the number of different materials handled, as well as the sequence of operations, may be varied to suit requirements. In the present instance an approximately predetermined quantity of one material is delivered to the weighing apparatus, accurately weighed and its true weight recorded. Thereupon an approximately predetermined quantity of the other material is added and the total is accurately weighed and the true weight thereof recorded, after which the two materials are discharged and the cycle repeated. A record is also advantageously made after such discharge to show whether or not any material failed to discharge and remains on the scale. Also, a record is made of the condition of the scale prior to the commencement of a cycle of operations to show the presence or absence of materials in the weighing apparatus. This is particularly advantageous if any substantial interval of time has elapsed between one cycle of operations and the next, as at the beginning of a new day's run.

The weighing apparatus here shown is conventional. It provides, in an appropriate form, a weight responsive member whose position represents the weight of the load on the scale. It is here represented by a beam scale having a weight responsive member in the form of a beam 10 which is counterbalanced in this instance by a conventional spring 11 which allows the beam to assume a position representing the weight on the scale. If desired, the beam may be counterbalanced by the conventional pendulum. The movement and positions of equilibrium of the beam are translated to a printing wheel 12 carrying printing type on its periphery arranged to register the weight reading in printing position. Preferably also the printing wheel shaft carries a pointer 13 traveling over the conventional scale dial (not shown) to give a visual indication of weights. The aforesaid mechanism is conventional and details thereof have been omitted for the sake of simplicity.

Figure 1:
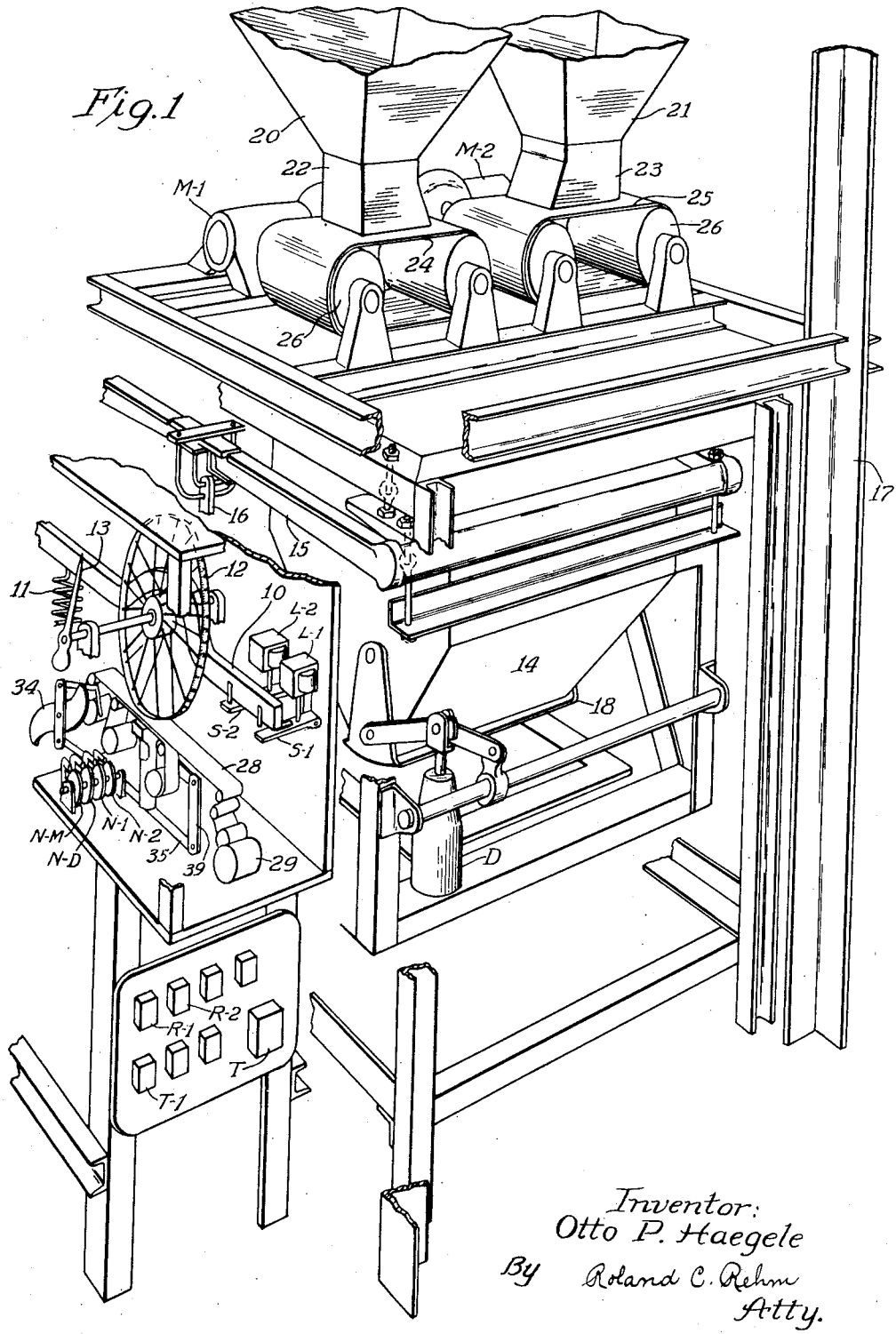
Fig. 1 is a perspective view of the weighing apparatus together with mechanism for feeding and discharging materials.

The character of the scale platform is influenced by the materials to be weighed and the manner of delivery to and removal from the scale. Bulk materials may advantageously be weighed, as here shown, in a dumping bottom hopper 14 supported on a system of scale levers 15 which are connected by the steel-yard 16 to the beam. The system of scale levers is likewise conventional and details thereof have been omitted for the sake of simplicity. The stationary fulcrums of the scale levers are appropriately supported on a frame 17 (see Fig. 1) which is shown broken away so as not to obscure more important portions of the apparatus. In the present instance the hopper is provided with a pivoted bottom closure 18 of a conventional character operated by an electrically controlled device D in the form of a thrustor whose construction is well known and which may be purchased on the open market. When energized, the thrustor opens the hopper and when deenergized, returns to normal position, allowing the hopper to close by gravity. The discharge mechanism is not of course limited to any particular type.

The material delivery mechanism is advantageously provided with means controlled by the weighing apparatus for interrupting delivery of materials to the scale. Such apparatus may likewise be varied according to the kind and number of materials handled. As here shown, granular or bulk materials may advantageously be supplied from bins 20, 21 etc. having discharge spouts 22, 23 etc. delivery materials to belts 24, 25 etc. which pass across and practically close the mouths of the respective spouts so that feed of a given material may be interrupted merely by interrupting the travel of the belt. The apparatus is here shown provided with two material feeds, but, as will presently appear, the number of materials handled may be varied to suit each particular case. The belts are here shown carried by rollers 26 mounted on horizontal axes on the frame and are driven by motors M—1 and M—2 toward each other so as to discharge the materials between the inner pair of rollers at a point above the weighing hopper 14. The motors and feeding mechanism depend upon the number of materials the apparatus is designed to handle.

As a quantity of material is being delivered to the scale, the scale beam 10 gradually rises with the load, rotating printing wheel 12 until the supply of material is arrested and the scale comes to a position of equilibrium representing the load on the scale. In the present instance, the printing wheel is adjusted with reference to the beam so that the figure at the bottom of the wheel represents the weight of the load. Such figure or figures are recorded by a printing hammer 27 which delivers a percussive blow to an interposed record sheet in the form of a paper tape 28 and causes the printing wheel to imprint thereon the weight of the load. As here shown, the record tape is supplied from roll 29 and wound upon roll 30 by conventional mechanism presently described. Ink is supplied in this instance by an inking ribbon 31 interposed between the printing hammer and the tape and which alternately is wound upon and unwound from ribbon rolls 32 and 33 by conventional ribbon feeding mechanism.

Obviously a variety of tape and ribbon feeding and recording mechanisms may be employed to record weights, those here shown being merely typical. The recording mechanism is driven by an electric motor M preferably through reducing means which slowly rotate a double lobe cam 34. Whether one or more lobes be employed on cam 34 depends largely on the speed reduction of the motor and the desired speed of operation of the recording mechanism. It will be understood that the arrangement is such that at each operation of motor M cam 34 is rotated through the angular distance embraced by one cam lobe. The latter actuates lever 35 pivoted at 36 through the agency of a link 37 which carries a cam roller 38. Lever 35 operates the printing hammer and ribbon feeding mechanism through link 39 pivoted thereto at its other extremity. A spring 40 moves link 39 upwardly and lever 35 in the opposite direction, and also holds roller 38 in operative contact with cam 34. Connected to the other end of link 39 is lever 41 pivoted at 42 which on the upward travel of link 39 sets or "raises" (in the present instance depresses) the printing hammer 27 against the pressure of its spring tensioned operating lever 43. Lever 44 also connected to link 39 not only trips the hammer operating lever 43 (on the downward travel of link 39) causing the hammer to deliver a sharp or percussive blow upon the printing wheel, but actuates the ribbon feeding pawl 45 whose extremities 46 and 47 successively engage the ribbon winding ratchets 48 and 49 to wind the ribbon from one roll to the other. The details of the aforesaid printing, actuating and feeding mechanism form no part of the present invention and need not therefore be further described. One example of such mechanism is illustrated in detail in co-pending Brendel application Serial No. 640,224.

The record tape feeding mechanism is actuated from the other end 50 of link 37 by a lever 51 pivoted at 52 and at its other end to link 53. The latter oscillates ball clutch mechanism 54 comprising ball 55 held by spring 56 against the tape roll operating disc 57, which together with the tape roll are mounted on shaft 58 supported by bracket 59. Oscillation of the clutch mechanism rotates the tape roll only in a counterclockwise direction (Fig. 2). Link 53 operates in the slotted arm 60 of the clutch mechanism 54 and is resiliently urged in the direction of the tape roll by a torsion spring 61. The angular rotation of the tape roll therefore varies with its diameter, thus insuring advance of the tape by uniform increments regardless of the diameter of the winding roll. The tape is therefore advanced one step upon the downward travel of link 37 (i. e. during the "setting" of the printing hammer) for each operation of motor M. In this connection it should be noted that the printing hammer is tripped on the first or upward travel of link 37 and the tape is advanced and the hammer "set" on the return or final movement.

The control of the operation of the material feeding mechanism which delivers various materials to the scale is effected in this instance by a series of electrical devices 70 which may be successively or selectively associated with the scale beam 10 so as to be controlled by predetermined positions thereof representing predetermined weights of one or more materials on the scale. The electrical devices in this instance (see Figs. 1, 3 to 6) are represented by switches S—1, S—2 etc., each comprising pairs of contacts 71 and 72, the latter being resiliently mounted on a flexible blade 73 and therefore movable relative to contact 71. In the interest of simplicity, only one of such devices, S—1, will be described, the others being similar thereto. The contacts are respectively insulated and mounted upon a movable support 74 which is adapted to follow the upward movement of the beam as the latter rises under loading of the scale. Support 74 is pivotally mounted at 75 to bracket 76 which is vertically adjustable on the fixed housing 77. In the present instance the contacts of that device 70 which is in active control, are resiliently elevated by solenoid L—1 or L—2 etc. as the case may be, to bring the insulated extremity 78 of contact 72 into engagement with the beam (or, in this case, with a downwardly depending finger 79 carried thereby). As here shown, the solenoid is resiliently connected to the contacts through a relatively light compression spring 80 carried by the solenoid rod 81 and bearing against the lower face of support 74. The spring 80, while sufficiently strong to raise the contacts 71 and 72 and close the same in contact with the beam, is not sufficiently strong to exert a substantial elevating force on the beam. However, as will presently appear, when the actual weight is recorded, the beam is entirely free of external forces which might interfere with the accuracy of the recorded weight. The solenoids L—1, L—2, etc. are designed so that their respective cores 82 have a range of travel appropriate to the distance through which the switch S—1 may be required to travel in following the beam. Likewise the springs 80 are designed to have sufficient length so that they may elevate the switches S—1, S—2, etc. throughout their expected range of travel. As will presently appear, these ranges may vary, depending upon the weight of the particular material involved.

When solenoid L—I is energized, the switch S—I is raised into contact with the beam as shown in Fig. 5, thereby breaking the electrical connection between contacts 71 and 72. Such contacts remain broken until the beam rises to a point where the adjustable stop 83 engages upper contact 71, arresting further upward movement of the switch and allowing contact 72 again to close on contact 71. The closing of such contacts at this time interrupts further addition of material to the scale by stopping the operation of feed motor M—I (as will be presently pointed out), but the small quantity of material which at that instant is in the process of falling into the hopper, is sufficient to raise the beam a slight distance completely out of contact with switch S—I (see Fig. 6). Thus the beam is clear of improper external influences which might influence the recorded weight and is left free to come to rest at a position accurately representing the weight of the load. The operation of the recording apparatus at this time therefore results in a record of the true weight of the load.

It will be understood that interruption of feed at an approximately predetermined weight is effected by vertically adjusting the solenoid brackets 76 relative to the housing 77 and the beam. Slots 84 in the housing or other appropriate means are provided for this purpose.

In this connection it should be noted that although the devices 70 may be vertically adjusted, with a fine adjustment of stop screw 83, to arrest feed at a predetermined weight of material, the apparatus makes a record of the weight of material actually added, which is independent of the adjustment of the devices 70.

When the switch S—I is closed as aforesaid, it commences a series of operations including interruption of feed (motor M—I), the operation of the recording mechanism to record the first charge, and the subsequent actuating of controls which inaugurate the next phase of the cycle, namely, the feeding, weighing and recording of the second charge of material. The operations involving the weighing and recording of the second charge are controlled by a similar switch S—2 operated by a similar solenoid L—2, both of which are vertically adjusted with respect to the beam on housing 77 so as to control the interruption of feed when the next predetermined weight is reached and the subsequent recording operation etc.

If a third material be added, a third switch S—3 and solenoid L—3 are brought into operation, and so on. Each solenoid L—I, L—2, L—3, L—4 etc. is respectively vertically adjusted relative to the beam to control the weight of the load of the respective materials delivered to the scale. Fine adjustments are in each instance made by the respective stop screws 83.

Generally it is not desirable to discharge the materials from the scale until the various charges of materials have all been added and the successive aggregate weights taken and recorded. However, if desired, the sequence of operations could be altered to effect discharge after the weighing and recording of each charge. Since the materials are generally eventually intermingled, it is far simpler to effect a discharge only once each cycle.

Generally the total range of movement of the beam is not sufficient to require that the members 78 on any of the switches clear the beam when in idle position (i. e. down) but, if in any case this be desired, the contact plates 79 can be placed on the opposite side of the beam and the devices arranged so that they will clear the beam when idle.

Following the addition of the last material to the scale, and the weighing and recording of the total weight thereof, the discharge mechanism D is actuated to discharge the materials from the scale. Thereafter the recording mechanism is again actuated to record the condition of the scale prior to the commencement of another cycle to show whether or not any material failed to leave the scale, in this case the weighing hopper. Also in order to have a record of the condition of the scale at the beginning of a series of cycles of operations, as where operations are resumed on the next day after an interval of idleness, the first operation of the apparatus on a new cycle is the recording of the condition of the scale so as to indicate whether or not any material is then on the scale. If the hopper be empty, the record will read "zero".

Primary control over the cycle of operations in this instance resides in a time switch S actuated by a time cam 90. The latter is advantageously rotated by a small self-starting synchronous motor T such as is employed in the operation of electric clocks. The cam 90 is designed in relation to its rate of rotation to close switch S at intervals represented by the desired duration of a cycle of operations. This frequency is determined not only by the length of time necessary for the performance of the foregoing operations, but by the number of cycles which the apparatus is desired to complete in a given interval of time. This makes it possible to synchronize the operation of the apparatus with a certain rate of production or perhaps to correlate it with the operation of other apparatus. Cam 90 is therefore made removable so that changes in duration of cycles and frequency of cycles may be made. It will be understood that the cycle frequency cannot exceed a certain maximum determined by the time necessarily consumed in a single cycle of operations.

Among the instrumentalities initially controlled by switch S is the motor M which operates the weighing and recording apparatus and also the mechanism which inaugurates successive feeding, weighing, discharging and related operations. Such mechanism is here shown in the form of a plurality of notched discs N—M, N—D, N—I, N—2, N—3 and N—4 etc. rotatably mounted on shaft 95. The latter also carries a ratchet wheel 96 by which a step by step rotation of the discs is effected by pawl 97. The latter is actuated by lever 35 on its return movement (i. e., upward movement in this case), after the recording of the weight. It will be noted that the notches 98 in the respective discs are relatively staggered and that the angular separation of successive notches in each disc is such that a complete cycle of operations occurs before a disc is turned from one notch to the next.

In the present instance, the motor M and discharge mechanism D are advantageously controlled by discs N—M and N—D associated with the other discs N—I, N—2, N—3 etc. which respectively control circuits associated with the feed control switches S—I, S—2, S—3 etc. The number of control discs employed is therefore equal to the number of materials handled plus two. Thus for two materials, four discs are employed.

Control is effected by the respective discs, in this instance through the medium of switches SN—M, SN—D, SN—I, SN—2, SN—3 etc., each of which (with the exception of switch SN—M) comprises a pair of insulated contacts 99 and 100 carried by contact supports 101 and 102. The former support is preferably resiliently mounted and carries roller 103 adapted to travel over the periphery of its disc and enter a notch 98 if and when the latter is rotated into registry with it. As shown more particularly in Fig. 8, the switch contacts and their supports are relatively arranged so that the contacts are closed only when the roller enters a notch on its disc and are held opened when the roller is not in a notch. Switch SN—M differs in this respect in that its contacts 104 and 105 are opened when its roller 106 enters a notch in the disc N—M. For that purpose, roller 106 is carried on the forward contact support 107 which is made resilient and, as shown in Fig. 2, when the roller is in notch 98, contacts 104 and 105 are separated. They are engaged at all other times when the roller rides on the periphery of the disc.

To secure the proper sequence of operations, the discs are relatively arranged on shaft 95 so as to stagger the notches so that the switch rollers will enter the notches in this order: N—1, N—2, N—3 etc. to N—D and N—M. This involves a closing of the respective switches in the order named except that switch SN—M is opened when its roller drops into the notch N—M at the end of the cycle, to remain there until another cycle starts.

As stated above, the number of discs in the sequence control mechanism depends upon the number of materials handled. To adjust the apparatus to handle a greater number of materials, it is not only necessary to add discs but either to change the notch spacing in the discs or to change the ratchet tooth spacing on ratchet 96 and the angle of oscillation of pawl 97 to accommodate the greater number of fractional rotations of the discs for the cycle of operations. It is found that in practice ratchets having forty and forty-two teeth will give the greatest capacity of variations in numbers of materials handled with a minimum replacement of parts of the sequence control mechanism.

To facilitate the illustration of the control of the sequence of operations by the aforesaid discs, the latter have been shown in diagram, Fig. 8, as provided with only one notch each whose angular separation for a series of six discs (for handling four materials) is 60°. In the diagram the discs are therefore given a rotation of 60° at each movement. Their direction of rotation in the diagram is counterclockwise. In actual practice, a greater number of notches is desirable since the ratchet mechanism cannot conveniently be arranged to rotate the discs through the large angle necessary particularly for a smaller number of materials.

In Fig. 7 is illustrated a typical electrically operated switch 108 similar to those employed in the control circuits and which for the sake of simplicity are herein referred to as relays. Such switches can be purchased on the open market and their details need not therefore be described. The switch here illustrated is solenoid operated and is provided with two sets of contacts 109 and 110 alternately opened and closed upon the movement of the core or armature 111 when the solenoid is energized and deenergized. In other words, one set of contacts 110 is normally closed, that is, closed when the solenoid is deenergized and the other set 109 is closed only when the solenoid is energized, at which time contacts 110 are opened.

In diagram, Fig. 8, those relays having sets of normally closed contacts such as R—2a, R—3a etc., T—M and T—Da are shown with the normally closed contacts cross-hatched. Those with normally opened contacts such as R—1, R—2b, R—3b etc., T—1, T—2 etc. are shown with the contacts separated.

In Fig. 8 the circuits, switches etc. have been illustrated in their relative positions and conditions at the end of a cycle or just prior to the beginning of a new cycle. The sets of switch contacts of the various relays are designated by the letters "R" and "T", the series designated by "R" being those associated with the various feed motors and the series designated by the letter "T" being those associated with the series of beam controlled switches S. The solenoid coils controlling the respective relay switches are correspondingly designated and preceded by the letter "C", the coil for switch R—1 being designated CR—1, etc. The motors are designated by the letter "M", the motor M being the motor operating the recorder and the sequence controlling discs, and the motors M—1, M—2 being the motors operating the respective material feeds. The letter "D" represents the discharge operating thrustor or equivalent mechanism. The series of feed controlling switches associated with the beam 10 are designated S—1, S—2 etc. and their corresponding solenoids are designated as L—1, L—2 etc. The sequence control switches are designated SN—1, SN—2 etc. to SN—D and SN—M. The cycle timing motor or equivalent mechanism has been designated as "T" and the switch controlled thereby as "S", the device T being actuated by a synchronous motor. Since the commercial power commonly available is alternating current, generally 60 cycles and 110 volts, the device T may advantageously be actuated by a synchronous motor. The electric power lines supplying electrical energy are designated respectively W—1, W—2.

Employing the foregoing reference characters and with particular reference to the diagram of Fig. 8, the following is a description not only of the control circuits but of the sequence of operations occurring in one cycle.

*Starting cycle of operations*

1. When main circuit is closed, time motor T starts—Circuit: line W—1 direct to T, then to line W—2.

*Initial operation of recorder*

2. Rotation of T eventually closes S which starts M, rotating cam 34 one-half revolution and mechanically operating recorder. Circuit: line W—1, through S, T—Da, S—1, S—2, S—3, etc. to M and line W—2. Closing of S energizes CT—M, opening T—M—Circuit: line W—1 through S. CT—M to line W—2. Incidentally T—M is always open (i. e. CT—M is energized) while S is closed. Also parallel circuits through coils CR—1, CR—2 and CR—3, CR—4, etc. will be energized—Circuits: line W—1, S, T—Da to each of CR—1, CR—2, etc. through S—1 and S—2, etc. to line W—2. This closes R—1, R—2b, R—3b, R—4b, etc. but opens R—2a, R—3a, R—4a, etc. Circuits through M—1, M—2, M—3, M—4, etc. are, therefore, still open.

3. Cam 34 (which motor M turns one-half revolution during its first operation) eventually rotates notched discs N—M, N—D, N—1, N—2, N—3, N—4, etc. one step, these being relatively arranged so that on the first operation of motor M the finger drops in notch in N—I, closing SN—I and energizing CT—I—Circuit: line W—I to SN—I, CT—I to line W—2. This closes T—I.

4. When T—I closes it energizes solenoid L—I—Circuit: line W—I to SN—I, T—I, through L—I to line W—2.

5. L—I then raises S—I against beam 10 opening its contacts (see Fig. 5), thus breaking the circuit (see paragraph 2) through S, T—Da, S—I, S—2, etc. to M, CR—2 and CR—3, etc., closing R—2a and R—3a, R—4a, etc. M therefore stops (cam 34 having made one-half revolution) since alternative circuit through T—M is open—see paragraph 2. R—I remains closed since S—I is not in its circuit.

First loading operation

6. The closing of contacts R—2a (see paragraph 5) starts feed motor M—I—Circuit: line W—I through R—2a, R—I through M—I to line W—2.

7. M—I operates feed and loads scale, beam 10 rising until S—I engages adjusted stop 83 and is closed (Fig. 6). This completes parallel circuits through each of CR—2 and CR—3, CR—4, etc. and M (opening R—2a, R—3a, R—4a, etc.)—Circuit: line W—I to and through S, T—Da, S—I and CR—2, S—2 and CR—3, S—3 and through CR—4, etc. and M to line W—2.

8. The energizing of CR—2 breaks R—2a and circuit through M—I (see paragraph 6). Feed stops but the material still falling will bring the beam up enough completely to clear S—I; thus the beam will not be affected by any forces other than the material in the hopper.

Weighing and recording of first load

9. M starts (see paragraph 7) the second half revolution of cam 34 operating recording mechanism to record weight of first charge, and afterwards operating the levers which fractionally rotate discs N—M, N—D, N—I, N—2, N—3, etc. first to raise SN—I out of notch in N—I, and then to allow SN—2 to enter notch in N—2, closing SN—2, but SN—3, SN—4, etc., SN—D still remaining open, and SN—M remaining closed.

10. Opening of SN—I will deenergize solenoid L—I, causing S—I to fall (still remaining closed)—(Circuit—see paragraphs 3 and 4). Subsequent closing of SN—2 energizes CT—2 closing T—2—Circuit: line W—I to SN—2, CT—2 to line W—2. Closing of T—2 energizes solenoid L—2—Circuit: line W—I, SN—2, T—2, L—2 to line W—2, thereby raising S—2 against beam, opening S—2 in preparation for the next loading operation (see Fig. 5) and breaking one of the parallel circuits (see paragraph 7) through motor M. R—3a closes; R—2b remains closed and cam 34 stops.

Second loading operation

11. Breaking of circuit through S—2 and consequent closing of R—3a establishes circuit through second feed motor M—2: line W—I through R—3a, R—2b (R—2 remains energized, see paragraph 7) to M—2 and back to line W—2.

12. Feed motor M—2 feeds until beam rises and stop 83 for S—2 engages and closes S—2. This energizes coil CR—3—Circuit: line W—I through S, T—Da, S—I, S—2, CR—3 to line W—2; and opens contacts R—3a breaking circuit to and stopping motor M—2, (circuit—see paragraph 11). Also closing of S—2 starts motor M on its third movement,—Circuit: line W—I to S, T—Da, S—I, S—2, etc. to M and to line W—2, and rotates cam 34.

Weighing and recording of second load

13. Motor M rotates cam 34 through its third one-half revolution during which the motor mechanically operates the recorder and, finally, fractionally rotates discs N—M, N—D, N—I, N—2 and N—3, etc. first raising SN—2 out of its notch and opening its contacts and then allowing SN—3 to fall into a notch and closing the latter's contacts (if more than two ingredients are being batched). The opening of SN—2 breaks the circuit through CT—2, thereby breaks the circuit through L—2 (circuit—see paragraph 10) and allows solenoid L—2 to fall. Closing of SN—3 energizes CT—3—Circuit: line W—I to SN—3, CT—3, to line W—2. This closes the normally open contacts of T—3 and energizes L—3, opening S—3 and thus stops motor M (circuit—see paragraph 12).

The third and any subsequent loading operations involve similar sequences of operations as those described above. If, as in this instance, only two ingredients are being batched, N—3, SN—3, T—3, L—3, S—3 and M—3 etc. are not present. Instead the notched discs are arranged so that the notch in N—D next becomes operative and permits the finger of SN—D to close SN—D. Closing of SN—D energizes CT—D. Circuit: line W—I to SN—D, CT—D to line W—2. This opens the normally closed contacts T—Da of T—D and breaks circuit through and stops motor M.

Discharge

14. Energizing of CT—D closes T—Db, energizing discharge mechanism D which remains operative long enough to clear scale (hopper)—Circuit: line W—I through SN—D, T—Db, mechanism D to line W—2. At the same time circuit through S—I, S—2, etc. and M is broken at T—Da.

15. The time cycle of motor T is made long enough to allow the foregoing operations including discharge before the opening of S. This occurs next. When S opens, CT—M is deenergized and contacts T—M are closed.

Recording of condition of scale following discharge

16. Since SN—M is still closed with the closing of T—M a circuit through motor M is established: Line W—I to T—M, SN—M, M to line W—2. The motor M operates recorder to show condition of scale after period of discharge, i. e. whether or not all material has run out of hopper, and rotates discs N—M, N—D, N—I, N—2, etc. until SN—D is raised out of its notch and its contacts opened, SN—I, SN—2, etc. remaining out of notches, as in diagram. Breaking of SN—D deenergizes coil CT—D and breaks circuit (see paragraph 14) through discharge mechanism D. This results in closing the discharge. M continues to rotate until cam 34 advances N—M, N—D, N—I, N—2, etc., permitting finger of SN—M to enter notch in N—M and breaking circuit to M at SN—M. This completes cycle, which starts again when timer T closes S.

The foregoing diagram shows the circuit arrangement for four material feeds, the circuits involving feed motors M—3 and M—4 being shown in dotted lines, thereby serving to show what instrumentalities must be added or may be omitted if the number of materials is greater or less than four. In the present instance, where the apparatus is designed for two materials, feed motors M—3 and M—4 together with the sequence controlling discs N—3 and N—4, the beam switches S—3 and S—4 and associated apparatus and circuits may be omitted. It will be understood of course that the apparatus may be used for a single material, in which case the record will be the true weight of each charge and the condition of the scale following each charge. On the other hand, if more than four materials be added, additional feed mechanism controlling circuits and their switches should be added in the same manner as indicated with reference to feed motors M—3 and M—4.

Figure 9:
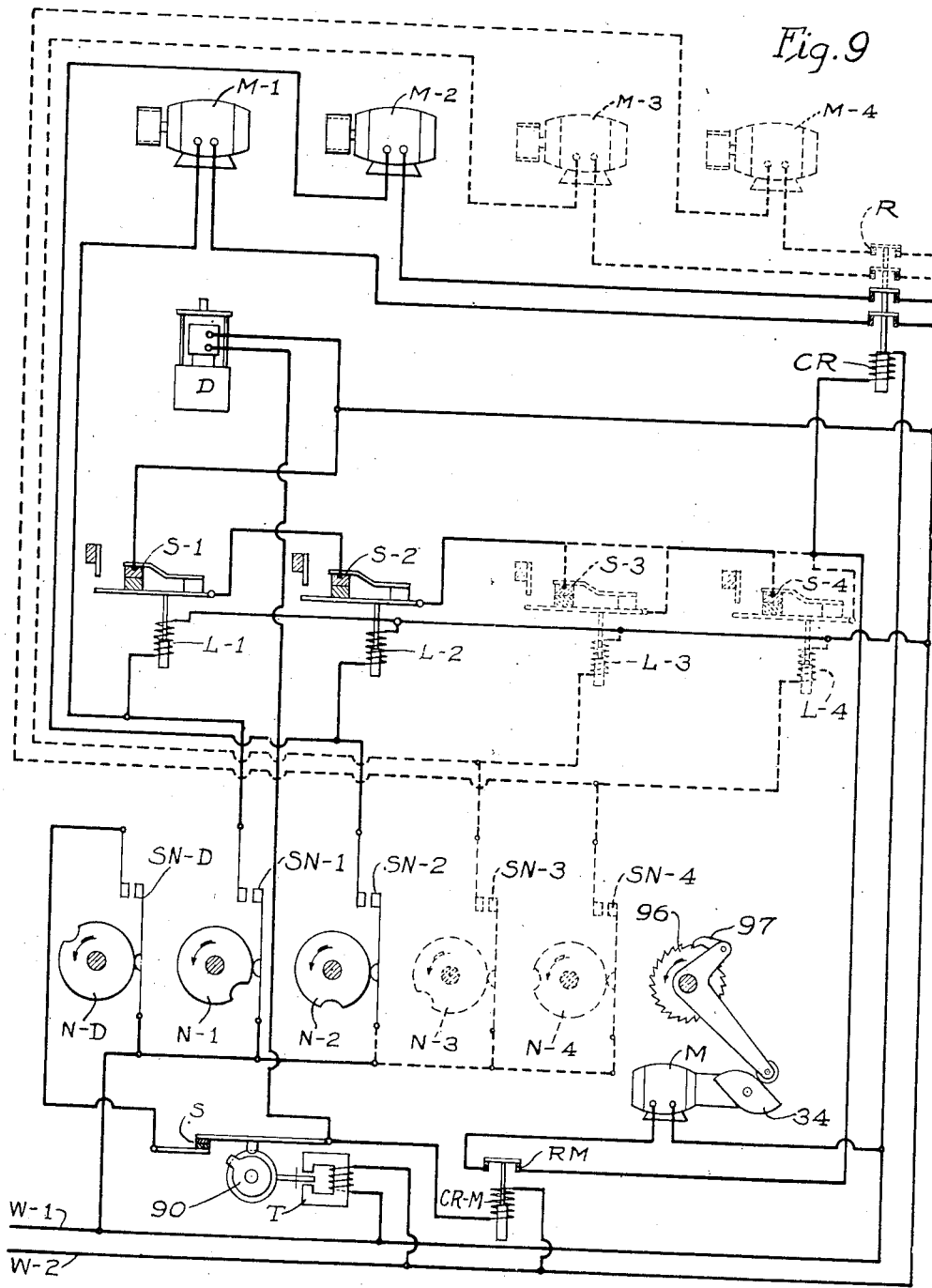

Fig. 9 is a diagram illustrating a simplified method of control for automatic operation which may be employed in place of the arrangement illustrated in Fig. 8. The simplified arrangement is distinguished from that of Fig. 8 largely in the use of a single normally closed contactor or relay R having multiple sets of contacts equal in number to the number of materials batched, in place of the relays CR—1, CR—2, CR—3 etc., and another normally closed relay R—M for motor M in place of an additional sequence control disc N—M as in Fig. 8. This simplification is made possible by the circumstance that the relays R operate more quickly than solenoids L. In other words, there is a lag in the operation of the solenoid switches S—1, S—2, etc. The diagram also shows, in a manner similar to that of Fig. 8, how control of the apparatus and sequence of operations for additional materials involving additional equipment, such as feed motors M—3, M—4 etc., is effected.

With the foregoing explanation, a brief description of the sequence of operations will suffice:

To start operations let us assume that cam disc N—1 has been rotated to allow switch SN—1 to close: Solenoid L—1 will then be energized to raise switch S—1 against the beam, thus opening switch S—1 and breaking the circuit through coil CR and through the recorder actuating motor M. Being a normally closed relay, all contacts through relay R are closed but a circuit is completed only through feed motor M—1 (SN—1 being closed) which thereupon starts to feed.

When a predetermined charge has been delivered, the beam reaches a point where S—1 is closed, thus energizing relay coil CR and breaking all relay contacts R and thereby stopping motor M—1 and starting motor M to perform the recording operations and to advance the cam discs N in a manner previously described. Such advance of the cams opens switch SN—1 and closes switch SN—2. It will be noted that so long as relay contact R—M remains closed, motor M is under control of solenoid switches S—1, S—2 etc., being energized whenever and so long as all of the latter remain closed.

Although the recorder motor starts substantially simultaneously with the interruption of feed of one of the feed motors, it will be understood that there is sufficient delay between the interruption of feed and the actual operation of the recorder printing hammer to allow the material still suspended in the air to fall on the scale, thereby causing the beam to clear the solenoid switch and the scale to come to balance.

Solenoid L—1 will therefore fall, with S—1 remaining closed, and the circuit made upon the closing of SN—2 energizes L—2, bringing S—2 into operative relation to the beam and opening the circuit through S—2. This again deenergizes relay coil CR, breaking the circuit through motor M and closing relay contacts R. Since switch SN—2 is closed, motor M—2 starts and delivery of the second material commences. This continues until the beam rises to allow switch S—2 to close, thereby energizing coil CR, starting recorder motor M and breaking relay contacts R. This stops feed motor M—2.

Upon the recording of the second charge of material added, the same operations are repeated for additional materials, if any, in the same manner as previously described. After the final material has been added and its weight recorded, the motor M will, on its next operation of the cam discs, rotate cam N—D to allow switch SN—D to close and energize the discharge apparatus D. The closing of switch SN—D will also energize coil CR—M, thus opening R—M and stopping motor M.

It will be understood that during the aforesaid operations the timer switch S remains closed.

The timer, having been adjusted to allow a sufficient interval for the performance of the foregoing operations, thereupon opens switch S, deenergizing coil CR—M, thereby starting motor M to record the condition of the scale following discharge. The motor finally rotates the cam discs, opening switch SN—D and closing switch SN—1, thereby starting the apparatus on a repetition of the aforesaid cycle. In this circuit it will be noted that resumption of the cycle is possible upon the opening of timer switch S, and the delay in again closing the switch S does not add to the length of the cycle.

Figure 10:
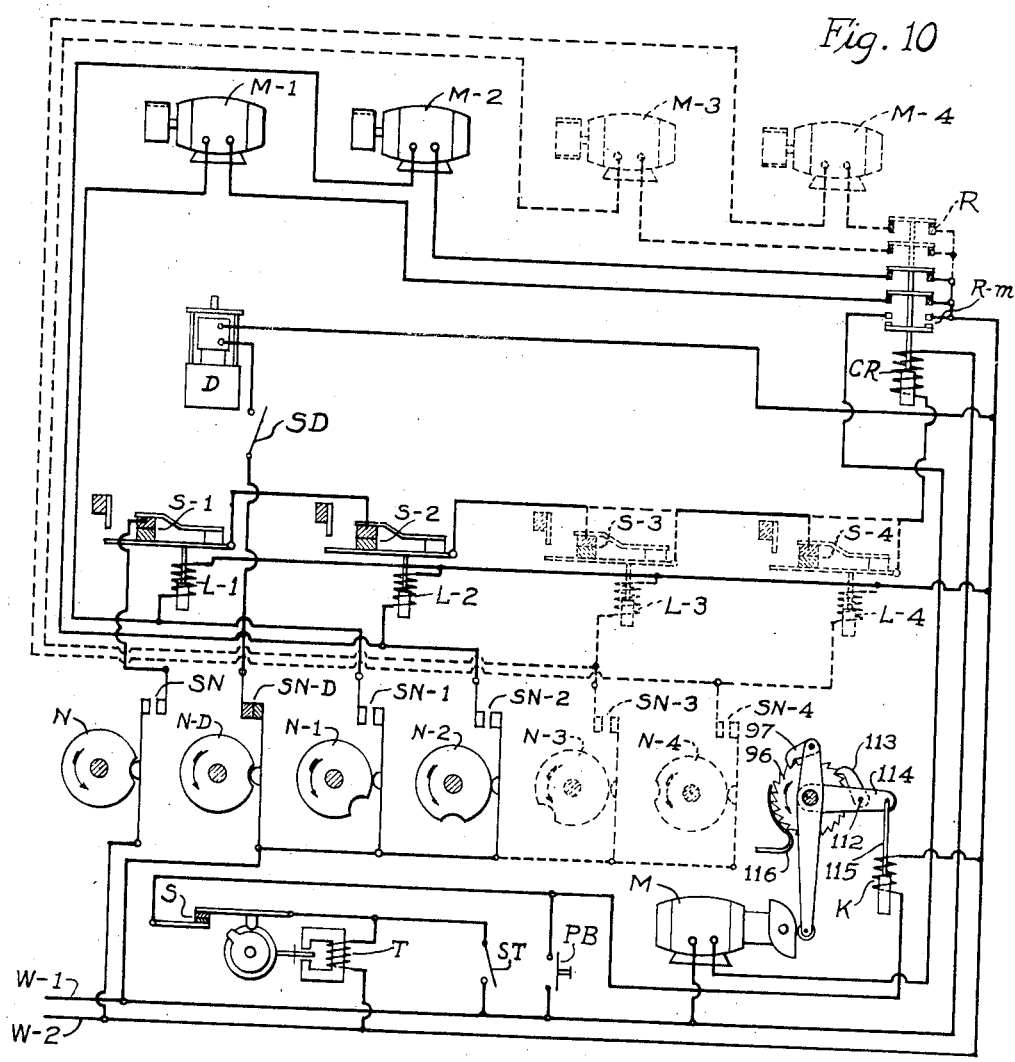

Fig. 10 is a diagram illustrating controlling mechanisms and circuits wherein automatic repetition of the cycle of operations may, if desired, be eliminated. In the present instance, the circuits may be so arranged that the momentary closing of a circuit (manually) inaugurates one complete cycle of operations, not including discharge of the batch. Independent control of discharge is provided so that it may occur at the convenience of the operator. After discharge, operation ceases until the switch is again momentarily closed. Control of this character has many uses, for example, in the batching of concrete where batching and discharge preferably should be under the manual control of the operator.

The control circuits and mechanisms differ from those previously described in the addition of a pair of normally open relay contacts R—m to relay R, the other relay contacts being, as in the circuit of Fig. 9, normally closed; in the interposition of a push button switch PB for inaugurating the aforesaid cycle of operations; and in the addition of switch SD for controlling discharge. Switch SN is normally closed, i. e., it is open only when the switch finger falls into the notch in controlling cam N. Also, cams N and N—D are in the same phase, i. e. both notches register with their switches simultaneously, the former to open switch SN and the latter to close switch SN—D. Cam N—1 is adjusted so that switch SN—1 is closed in the same operation which closes switch SN. Associated with the circuit controlled by the push button switch is a solenoid operated ratchet mechanism 112 comprising a ratchet pawl 113 carried on the oscillating arm 114, the latter being connected to the core 115 of solenoid K. As will presently appear, the aforesaid manual control of the inauguration of a cycle of operations is effected by momentarily closing the push button switch PB to energize solenoid K, thereby advancing the sequence control cams N—1, N—2, etc. one step. A brake or friction drag 116 is preferably provided to prevent over-travel of the ratchet disc and cams N—1 etc. due to the sudden movement which may be imparted thereto by the solenoid K.

With the foregoing explanation, the following description of sequence of operations will suffice: For manual control, switch ST is open, thus cutting out the timer T which otherwise would effect automatic repetition of the cycle. To inaugurate the cycle of operations the operator momentarily closes push button switch PB. This energizes solenoid K as aforesaid and advances the sequence control cams one step, closing switches SN and SN—1 and opening SN—D (the diagram illustrating the condition of the circuit just prior to the operation). The closing of switch SN completes the circuit through coil CR, closing the normally open contacts R—m and starting recorder operating motor M (making a record of the condition of the scale at the beginning of the cycle of operations), and eventually advancing the control cams another step, closing switch SN—1 and energizing solenoid L—1 to move switch S—1 into operative engagement with the beam. The consequent opening of switch S—1 deenergizes coil CR, opening contacts R—m, thereby stopping motor M. The closing of contacts R starts feed motor M—1 (its circuit being completed through switch SN—1). The other motor circuits still remain open.

The addition of a predetermined charge to a scale causes the beam to rise and eventually bring about the closing of switch S—1 which energizes coil CR, stopping motor M—1 and starting motor M to effect a record. As in the arrangement illustrated in Fig. 9, there is sufficient delay between the interruption of feed and the actual operation of the recorder printing hammer to allow the beam to clear the switch and to come to true balance.

The motor M eventually rotates the sequence control cams which result in the breaking of the circuit through solenoid L—1, allowing it to fall, and closing switch SN—2, energizing solenoid L—2 and opening switch S—2. This deenergizes relay coil CR, stopping motor M and starting feed motor M—2. Upon the closing of switch S—2, coil CR is energized, stopping motor M—2 and starting motor M to effect a record as before. The aforesaid operations are repeated for each of the feed motors if more than two be employed as will be apparent from the diagram of Fig. 10. When the final material has been added and the motor M energized to make a record, its next operation of the sequence control cams results in the opening of switch SN and closing of switch SN—D, thereby deenergizing coil CR. The discharge mechanism however is not operated until switch SD is manually closed. When discharge of the materials has been completed, the operator opens discharge switch SD. Thereafter the apparatus remains idle until push button switch PB is momentarily closed to inaugurate another cycle of operations.

For automatic repetition of sequence of operations, it is merely necessary to close switches ST and SD, thus bringing the circuits under the control of timer T and its switch S. When the latter closes, it energizes solenoid K, effecting a partial rotation of the sequence control cams, closing switches SN and SN—1 and opening switch SN—D. Relay coil CR is thus energized, closing contacts R—m and starting recorder motor M. Following this, the same sequence of operations as above described will occur and the timer T will effect automatic repetition of the cycle.

It will be understood from the foregoing that the invention is applicable to many different industrial processes including but not limited to batching, such for example as weighing and recording of predetermined quantities of materials comprising concrete, the proportioning and weighing and recording of materials comprising any of a wide variety of chemical compounds and mixtures. The record not only shows the performance of the apparatus for each cycle in each day's run but gives the exact quantities of the different materials in each batch and shows whether and in what instances and to what extent the proportions weighed out depart from the desired proportions or specific weights for which the machine was set and whether and in what instances and to what extent material remained on the scale (in the hopper) when it should have been discharged. It should be understood that in the present case material remaining in the hopper affects only the previous batch. If specific weights as distinguished from proportions of weights be desired, the record shows how accurately the apparatus is delivering the desired weights and affords a means for setting the apparatus accurately.

Obviously the invention is not limited to the details of the illustrative construction since these may be variously modified. Moreover, it is not indispensable that all features of the invention be used conjointly since various features may be used to advantage in different combinations and subcombinations.

Having described my invention, I claim:

1. Apparatus of the character described comprising in combination a scale having a weight responsive member whose position indicates the weight of the load on the scale, means for delivering a charge of material to said scale to be weighed, delivery controlling means including a follower adapted to be associated with said load responsive member to secure the delivery of a charge of material of predetermined weight and including an adjustable stop adapted to interrupt movement of said follower at a predetermined weight, thereby to interrupt delivery of materials to said scale, said control means allowing a small quantity of material to fall on said scale after interruption of delivery thereby to move said weight responsive member out of engagement with said follower, and weight exhibiting means adapted independently to exhibit the true weight of the load on said scale.

2. Apparatus of the character described comprising in combination a scale having a weight responsive member whose position represents the weight of the load on the scale, mechanism for successively delivering a plurality of charges of different materials to said scale for weighing, a series of delivery controlling devices including followers adapted to be successively actuated to follow the movement of said weight responsive member to control the delivery of a charge of material of predetermined weight to said scale, and mechanism for automatically successively actuating said delivery controlling means to effect the delivery of successive charges of predetermined weights of materials to said scale.

3. Apparatus of the character described comprising in combination a scale having a weight responsive member whose position represents the weight of the load on the scale, mechanism for successively delivering a plurality of charges of different materials to said scale for weighing, a series of delivery controlling devices including followers adapted to be successively actuated to follow the movement of said weight responsive member to control the delivery of a charge of material of predetermined weight to said scale, and controlling circuits connecting said followers and said delivery mechanism and operative to interrupt delivery of a given material when the respective follower reaches a predetermined position representing a predetermined weight of material.

4. Apparatus of the character described comprising in combination a scale having a weight responsive member movable to a position representing the weight of the load on the scale, material feeding devices for feeding charges of a plurality of materials to said scale, a series of feed control devices and operating circuits for controlling the respective feeding devices, said feed control devices each having followers comprising a pair of electrical contacts adapted to be placed in operative relation to said weight responsive member to control the delivery of material to said scale, said contacts being arranged to open when placed in operative relation with said weight responsive member, relays actuated by the opening of said contacts to start the operation of a feeding device, and means for interrupting the movement of a follower when a predetermined charge of material has been delivered to said scale, said means being operative to close the contacts of said follower and thereby to interrupt said delivery.

5. Apparatus of the character described comprising in combination a scale, material delivery devices for delivering different materials to said scale, a recorder for recording the weights of charges of material delivered to said scale, sequence controlling mechanism for automatically alternately actuating the successive feeding devices and the recorder, thereby to record the weight of successive charges of material delivered to said scale, and a frequency controlling device adapted to inaugurate each cycle of operations, thereby to control the frequency of cycles of operations.

6. Apparatus of the character described comprising in combination a scale having a load responsive member movable to a position representing the weight of the load, a material delivery device having a controlling circuit, delivery controlling mechanism including a hinged follower provided with a pair of contacts adapted to be moved into engagement with said load responsive member, said contacts being opened upon said engagement, a relay in said controlling circuit for starting delivery upon the opening of said contacts, an adjustable stop device adapted to be engaged by said follower when moved to a position representing a predetermined weight to close said contacts, and a circuit for interrupting delivery of material upon the closing of said contacts.

7. Apparatus of the character described comprising in combination a scale having a load responsive member whose position represents the weight of the load on the scale, a series of material delivery devices for delivering materials to the scale, operating circuits for the respective delivery devices, sequence control mechanism having switches in the respective circuits which are successively closed and opened during a cycle of operations, normally closed solenoid controlled switches also in and controlling the respective operating circuits, a series of load responsive control switches associated with the load responsive member and adapted to be closed at predetermined loads, solenoid energizing circuits including said control switches to effect the opening of a delivery device circuit upon the closing of its control switch at a predetermined load, and means for controlling the repetition of a cycle of operations.

8. Apparatus of the character described comprising in combination a scale having a load responsive member movable to a position representing the weight of a load upon the scale, means for controlling the delivery of a plurality of different materials to said scale, a recorder for recording the weights of charges of material delivered to said scale, devices successively actuated by the load responsive member at a succession of predetermined positions representing the weights of the charges of the respective materials for energizing said controlling means to interrupt delivery, means associated with said recorder for energizing the controlling means to effect a delivery of the succeeding charge after the operation of the recorder, and means for operating said recorder upon interruption of delivery of a charge.

9. Apparatus of the character described comprising in combination a scale having a load responsive member whose position represents the weight of the load, means for delivering successive charges of different weights of material to the scale, delivery controlling means having an element in engagement with said load responsive device and movable therewith, said controlling means being adjustable to arrest movement of said element at a predetermined weight and to interrupt delivery, the material reaching the scale between said arrested movement and interruption of delivery being sufficient to carry said load responsive member out of contact with said element so that the latter will not influence the position of said load responsive member, and recording means whose position is controlled by said load responsive member operative thereupon to record the true weight of the charge of material delivered to said scale.

10. Apparatus of the character described comprising in combination a scale having a load responsive member whose position represents the weight of the load on the scale, means for delivering material to the scale, means actuated at successive predetermined positions of said load responsive member for interrupting delivery of material at a succession of corresponding weights of material, and recording mechanism controlled by the position of said load responsive member for recording the weight of the load on the scale following each interruption of delivery.

11. Apparatus of the character described comprising in combination a scale having a load responsive member movable in response to the load on the scale to a position representing the weight of said load, mechanism for controlling the delivery of material to said scale, means for following the movement of said load responsive member, said means having adjustable devices for limiting its following movement at a predetermined load, means for actuating said delivery controlling mechanism to interrupt delivery when said following means is limited, said load responsive member being adapted to move sufficiently after interruption of delivery to clear said following means, and recording mechanism actuated after said load responsive member clears to record the weight of the load on said scale.

12. Apparatus of the character described comprising in combination a scale provided with a receiver for receiving charges of materials to be weighed, feeding means for successively delivering a plurality of charges of different weights to said receiver, mechanism associated with said scale for controlling said feeding means to deliver a predetermined weight of charge to said receiver, a load responsive member movable to a position representing the weight of the load in such receiver, a recorder controlled by the position of such load responsive member for recording the weight of material in said receiver, and means for actuating said recorder to record the weights of materials added to said receiver independently of said feed controlling mechanism.

13. Apparatus of the character described comprising in combination a scale having a receiver for receiving charges of material to be weighed and having a discharge outlet, a weight responsive member movable to positions representing the weight of the load on the scale, an outlet closure for controlling the discharge of material, a recorder controlled by the position of said weight responsive member for recording the weight of loads on the scale, and automatic means for actuating said recorder after the opening of said discharge outlet for recording the weight of any material remaining in said receiver and failing to discharge therefrom.

14. Apparatus of the character described comprising in combination a scale, mechanism for successively delivering a plurality of charges of different weights of materials to said scale for weighing, a weight responsive member movable to positions which represent the weight of the load on the scale, a recorder controlled by said weight responsive member, mechanism operative at a plurality of different predetermined weights for controlling said delivery mechanism to terminate delivery of a predetermined charge, and sequence controlling means for alternately actuating said recorder and the delivery of successive charges to said scale.

15. Weighing apparatus of the character described comprising in combination a scale, mechanism for controlling the delivery of charges of different weights of material to said scale to be weighed, a load responsive member movable to successive positions representing the weights of the successive loads on the scale, a recorder responsive to the control of said load responsive member for recording the weights of successive loads of materials on said scale, and means for controlling said delivery mechanism and recorder so as to secure alternate operation thereof to effect the weighing and recording of successive charges of material, said controlling means being adapted to actuate said recorder prior to the beginning of a cycle of delivery operations to record the weight of any materials remaining on the scale and not discharged therefrom after the previous cycle.

16. Apparatus of the character described comprising in combination a scale having a load responsive member whose position represents the weight of the load, mechanism for delivering successive charges of different weights to the scale, delivery controlling means for each of said different charges each including an element adapted to be placed in operative relation to said load responsive member and to be controlled by the latter for interrupting the delivery mechanism at a predetermined weight, means for placing said elements successively in operative relation to said load responsive member during the delivery of the charges controlled by the respective elements, and recording mechanism for recording the weights of the load actually on the scale after each interruption of delivery.

17. Apparatus of the character described comprising in combination a scale having a load responsive member whose position represents the weight of the load, means for controlling the delivery of successive charges of material to the scale, devices associated with the weight responsive member and controlled thereby for interrupting delivery of a charge of material at an approximately predetermined weight, and recording mechanism for successively recording the actual weight independently of the extent of its departure from the predetermined weight of the material actually delivered to the scale as determined by the position of said load responsive member.

OTTO P. HAEGELE.

CERTIFICATE OF CORRECTION.

Patent No. 2,132,237. October 4, 1938.

OTTO P. HAEGELE.

It is hereby certified that the name of the assignee in the above numbered patent was erroneously written and printed as "Streeter-Arnet Company", whereas said name should have been written and printed as Streeter-Amet Company, of Chicago, Illinois, a corporation of Illinois, as shown by the record of assignments in this office, and that the said Letters Patent should be read with this correction therein that the same may conform to the record of the case in the Patent Office.

Signed and sealed this 22nd day of November, A. D. 1938.

Henry Van Arsdale
Acting Commissioner of Patents.

(Seal)